United States Patent
Odic

Patent Number: 6,073,853
Date of Patent: Jun. 13, 2000

[54] CONNECTOR FOR A CARD READER HAVING CONTACTS WITH TWOFOLD DETECTION

[75] Inventor: Emmanuel Odic, Pontarlier, France

[73] Assignee: Framatome Connectors International, Courbevoie, France

[21] Appl. No.: 09/081,237

[22] Filed: May 19, 1998

[30] Foreign Application Priority Data

May 30, 1997 [FR] France .................................. 97 06692

[51] Int. Cl.$^7$ ........................................ G06K 7/00
[52] U.S. Cl. ........................... 235/486; 439/188; 361/737
[58] Field of Search ................................ 235/486, 380, 235/381, 475, 477, 480, 483, 485; 361/737, 86, 83; 439/489, 188; 200/46, 283, 284

[56] References Cited

U.S. PATENT DOCUMENTS

| | | | |
|---|---|---|---|
| 4,166,369 | 9/1979 | Nakajima | 72/389.2 X |
| 4,929,821 | 5/1990 | Kocznar | 235/432 |
| 4,931,622 | 6/1990 | Ohtsuki et al. | 235/487 |
| 5,145,416 | 9/1992 | Cruise et al. | 439/668 |
| 5,259,777 | 11/1993 | Schuder et al. | 439/188 |
| 5,332,890 | 7/1994 | Kitahara | 235/440 |
| 5,395,259 | 3/1995 | Casses | 235/475 X |
| 5,667,397 | 9/1997 | Broschard, III et al. | 439/188 |
| 5,669,779 | 9/1997 | Galloway et al. | 439/188 |
| 5,714,742 | 2/1998 | Ieda | 235/441 |
| 5,892,213 | 4/1999 | Ito et al. | 235/441 |
| 5,905,253 | 5/1999 | Ito et al. | 235/486 |
| 5,924,881 | 7/1999 | Yasushi et al. | 439/188 |

FOREIGN PATENT DOCUMENTS

| | | |
|---|---|---|
| 0660253 A1 | 6/1995 | European Pat. Off. . |
| 2714534 | 6/1995 | France . |
| 2735599 | 12/1996 | France . |
| WO 91/04547 | 4/1991 | WIPO . |

*Primary Examiner*—Donald Hajec
*Assistant Examiner*—James Yven
*Attorney, Agent, or Firm*—Perman & Green, LLP

[57] ABSTRACT

A connector for a smart-card reader, includes at least two conducting blades (1,2), the first blade (1) of which has a bearing surface (3) shaped so as to be able to be forced by part of the card, upon insertion of the latter into the reader, to move this blade (1) relative to the second blade (2) so as to establish contact between these two blades (1,2), or alternatively to break, contact between the latter, and so as to detect the end of travel of the card. The bearing surface (3) of the first blade (1) is shaped so as to allow a slight movement of the card beyond the end-of-travel position. The second blade (2) includes a bearing surface (5) shaped so as to be able to be forced by the card, when the latter is moved beyond the end-of-travel position, to move the second blade (2) to a position in which it is no longer in contact with the first blade (1), or alternatively to a position in which it comes into contact with the latter.

10 Claims, 2 Drawing Sheets

CONNECTOR FOR A CARD READER HAVING CONTACTS WITH TWOFOLD DETECTION

The present invention relates to a connector for a smart-card reader, which includes at least two conducting blades for detecting the end of the insertion travel of the card in the reader, i.e. for detecting that this card is correctly positioned in the reader.

Such a connector is described in particular in French Patent 93/15682 in the name of the Applicant.

The first conducting blade has a bearing surface shaped so as to be able to be forced by part of the card, upon insertion of the latter into the reader, to move this blade towards the second blade so as to establish contact between these two blades and so as to detect the end of travel of the card.

In French Patent 95/07073, a "push-push" system is described which brings the card back to the correct position when this card has slightly exceeded the end-of-travel position.

The object of the present invention is to create a connector having end-of-travel contact blades allowing twofold detection, namely detection of the end of travel proper and that of a position of the card lying slightly beyond this end-of-travel position.

The invention thus provides a connector for a smart-card reader, which includes at least two conducting blades, the first blade of which has a bearing surface shaped so as to be able to be forced by part of the card, upon insertion of the latter into the reader, to move this blade relative to the second blade so as to establish contact between these two blades, or alternatively to break the contact between the latter, and so as to detect the end of travel of the card.

According to the invention, this connector is characterized in that the bearing surface of the first blade is shaped so as to allow a slight movement of the card beyond the end-of-travel position and in that the second blade includes a bearing surface shaped so as to be able to be forced by the card, when the latter is moved beyond the end-of-travel position, to move the second blade to a position in which it is no longer in contact with the first blade, or alternatively to a position in which it comes into contact with the latter.

The two contact blades thus provide twofold detection.

In the case of a connector for a card reader equipped with a "push-push" system, as described in French Patent 95/07073, the second detection provided by the invention can trigger the "push-push" system in order to bring the card back to the position in which the first detection is provided.

Thus, if desired, it is possible, by virtue of the two blades, to provide twofold switching.

According to a preferred embodiment of the invention, the two blades extend approximately parallel to the direction of movement of the card and each have, close to their free end, a part bent into the shape of a hump constituting the said bearing surface.

Preferably, the two hump-shaped bent parts of the two blades are offset along the direction of movement of the card.

In one version of the invention, the two blades are approximately coplanar.

In this version, these blades lie in a plane parallel to the plane of insertion of the card into the reader.

Advantageously, the first blade has, at its free end beyond the hump-shaped bent part, a branch which extends towards the second blade and is capable of coming into contact with a part of the second blade.

Also preferably, the said part of the second blade is a branch of the latter, this branch forming a fork with an adjacent branch carrying the hump-shaped bent part of the second blade.

In the above version, the straight part of the two blades is housed in an electrically insulating part of the connector.

Other features and advantages of the invention will also appear in the description below.

In the appended drawings, given by way of non-limiting examples:

Figure 1:
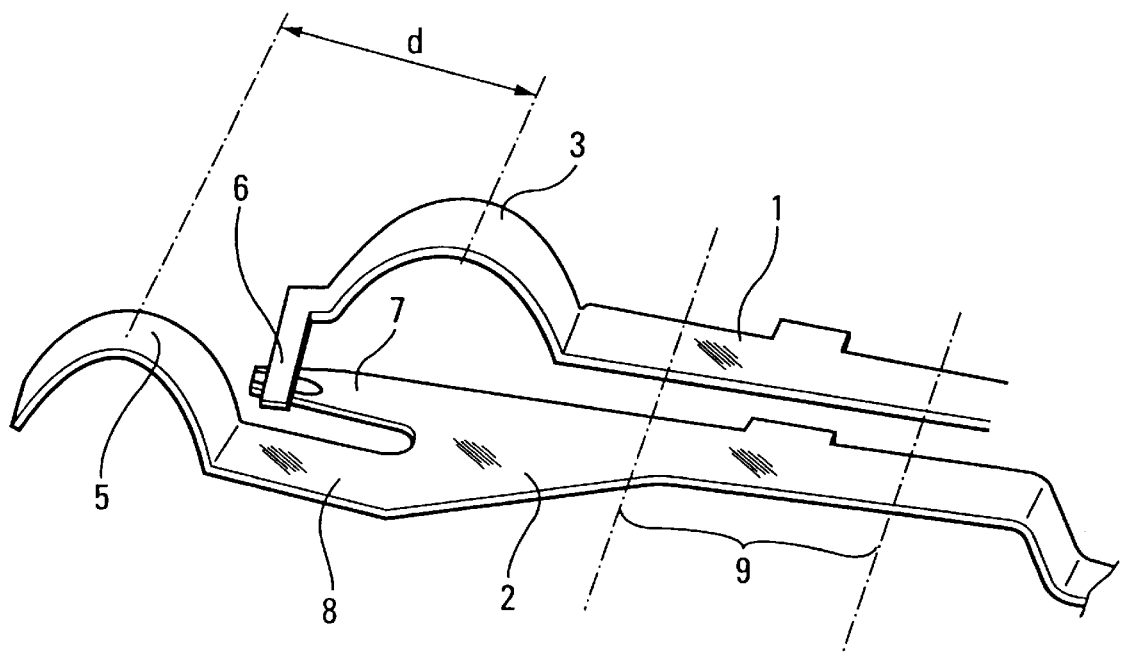
FIG. 1 is a perspective view of the two contact blades of a connector according to the invention.
Figure 2:
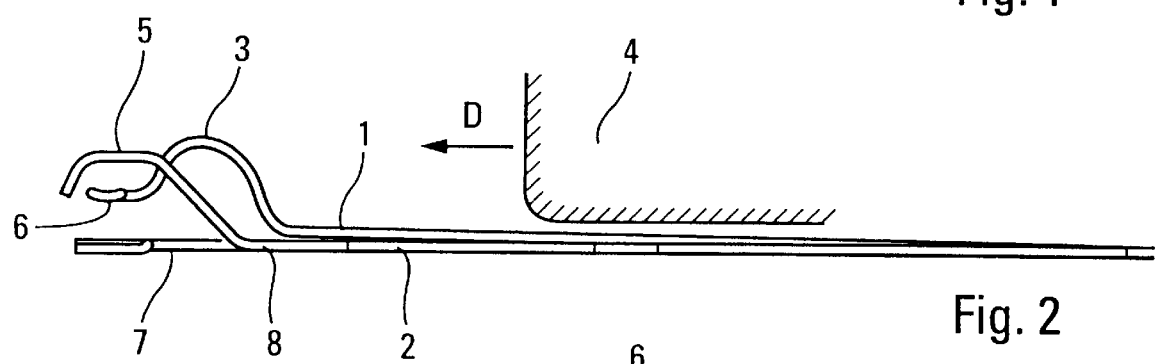
FIG. 2 is a side view of the two contact blades.

Referring to FIGS. 1 and 2, the connector for a smart-card reader includes two conducting blades 1,2, for example made of metal, the first blade 1 of which has a bearing surface 3 shaped so as to be able to be subjected to a force by the edge of the card 4 upon insertion of the latter into the reader. This force causes this blade 1 to move towards the second blade 2 and establishes contact between these two blades 1,2 so as to detect the end of travel of the card 4.

According to the invention, the bearing surface 3 of the first blade 1 is shaped so as to allow a slight movement d (1 to 2 mm) of the card 4 beyond the end-of-travel position.

Moreover, the second blade 2 includes a bearing surface 5 shaped so as to be able to be subjected to a force by the card 4 when the latter is moved beyond the above end-of-travel position. This force causes the second blade 2 to move to a position in which it is no longer in contact with the first blade 1.

It is thus possible to carry out the following sequence:
1) no contact between the blades 1,2—the card 4 is not in the end-of-travel position;
2) contact between the two blades 1,2—the card 4 is in the end-of-travel position;
3) no longer contact between the blades 1,2—the card 4 has been moved beyond the end-of-travel position; and
4) contact between the two blades 1,2—the card 4 is in the second detection position lying at a distance d from the end-of-travel position proper.

When the card is removed, the above sequence is reversed.

In an alternative embodiment, by imagining the first blade as being placed beneath the second blade, the above sequence 1,2,3,4 may be reversed as follows:
1/ contact made
2/ contact broken
3/ contact made
4/ definitively broken.

In the embodiment according to FIGS. 1 and 2, the two blades 1,2 extend approximately parallel to the direction of movement D of the card 4 and each have, close to their free end, a part 3,5 bent into the shape of a hump in order to form a bearing surface for the card 4.

As may be seen in FIGS. 1,2, the two hump-shaped bent parts 3,5 of the two blades 1, 2 are offset by a distance d along the direction of movement D of the card 4.

Moreover, the two blades 1,2 are approximately coplanar and lie in a plane parallel to the plane of insertion of the card 4 into the reader.

In the example shown, the first blade 1 has, at its free end beyond the hump-shaped bent part 3, a branch 6 which extends towards the second blade 2 and is capable of coming into contact with a part 7 of the second blade 2 when the card 4 is in the so-called end-of-travel position.

This part 7 of the second blade 2 is a branch of the latter, this branch forming a fork with an adjacent branch 8 carrying the hump-shaped bent part 5 of the second blade 2.

The straight part 9 of the two blades 1,2, which is shown in FIG. 1, may, for example, be overmoulded in an electrically insulating part of the frame of the connector which carries the contact brushes which come into contact with the conducting areas of the microcircuit of the card when the latter is in the end-of-travel position.

Figure 3:
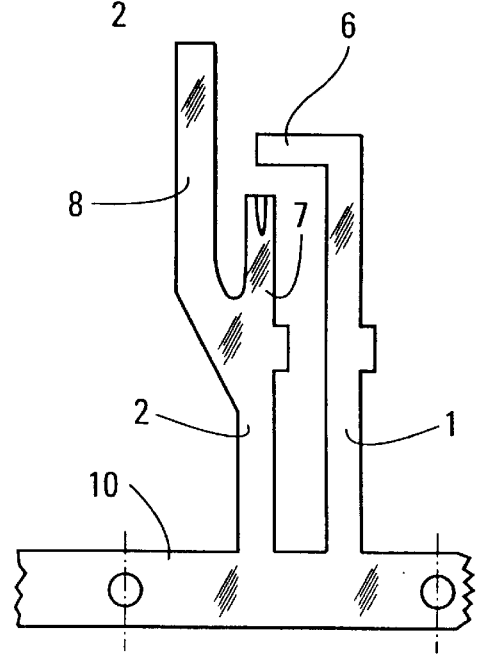
FIG. 3 is a plan view of the two contact blades cut out from a flat sheet of metal, before the bearing surfaces are bent.

As indicated in FIG. 3, the blades may be produced by cutting them out from a flat metal sheet 10.

This operation is followed by a bending operation in order to form the curved bearing surfaces 3 and 5.

Figure 4:
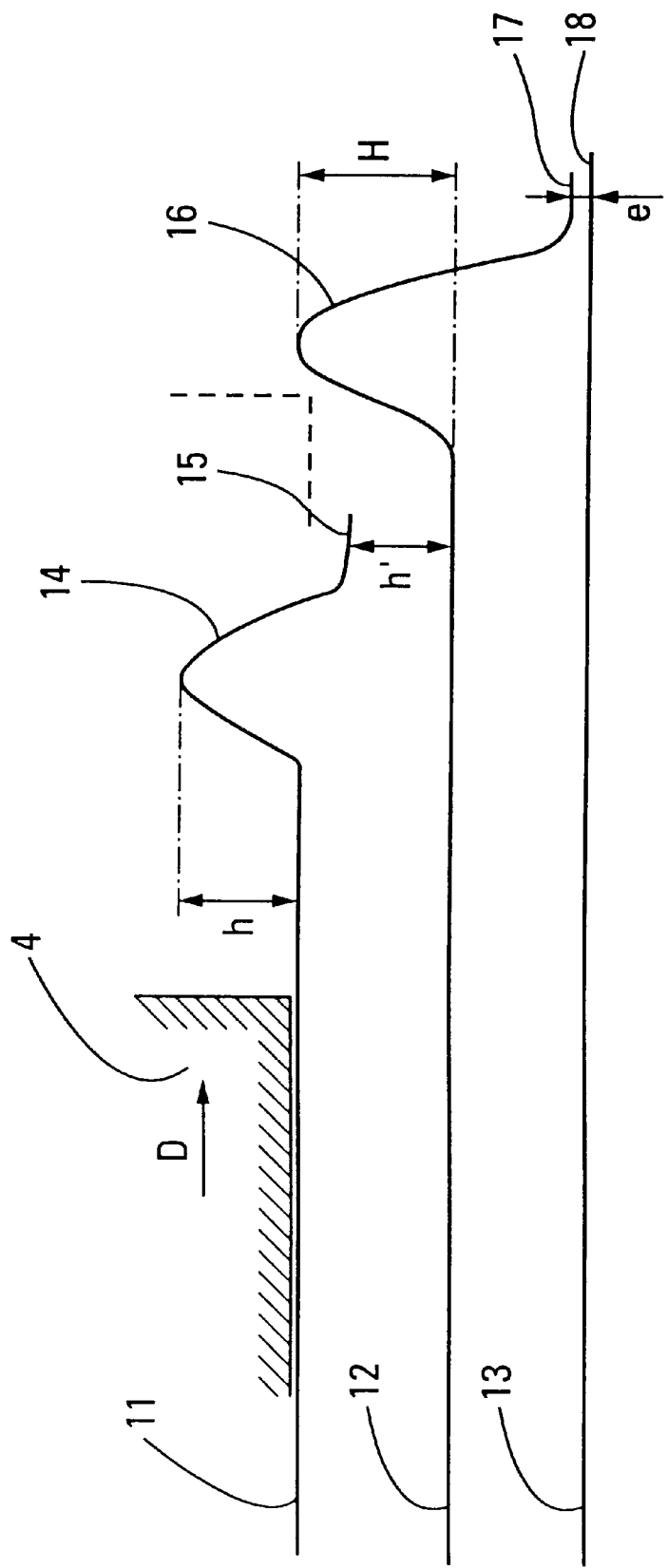
FIG. 4 is a diagrammatic view showing an alternative embodiment comprising three contact blades.

In the diagrammatic embodiment shown in FIG. 4, the connector includes three blades 11,12,13 which are approximately parallel and separated from one another with respect to the plane of insertion of the card 4 into the reader.

The first blade 11 carries, near its end, a bent part 14 forming a hump extended by an end 15 capable of coming into contact with the second blade 12 upon insertion of the card 4, in order to detect a first position of the latter.

The second blade 12 carries, near its end, a bent part 16 forming a hump, which part is offset with respect to the bent part 14 of the first blade 11 along the direction of movement D of the card 4. This bent part 16 is extended by an end 17 capable of coming into contact with the end 18 of the third blade 13 when the card is moved beyond the above end-of-travel first position. This third blade 13 is straight over its entire length.

In this second version of the invention, the height h of the bent part 14 of the first blade 11, the distance h' between the end 15 of the first blade 11 and the second blade 12, the height H of the bent part 16 of the second blade 12 and the distance e between the end 17 of the second blade 12 and the end 18 of the third blade 13 satisfy the following relationship:

$$H > h + e > h > h'.$$

The embodiment shown in FIG. 4, with three non-coplanar blades 11,12,13, thus makes it possible to detect two offset positions.

In each of these two positions, it is possible to transmit information.

Thus, the connection between the blades 11,12 could allow the initiation of a first sequence of operations or of instructions, while the connection between the blades 12 and 13 (and the disconnection of the blades 11,12) could stop the first sequence and, optionally, initiate another sequence.

Of course, the invention is not limited to the embodiments just described, and it is possible to make many modifications to them without departing from the scope of the invention.

I claim:

1. Connector for a smart-card reader, which includes at least two conducting blades (1,2), the first blade (1) of which has a bearing surface (3) shaped so as to be able to be forced by part of the card (4), upon insertion of the card into the reader, to move this blade (1) relative to the second blade (2) so as to establish contact between these two blades (1,2), or alternatively to break the contact between the two blades, and so as to detect the end of travel of the card, characterized in that the bearing surface (3) of the first blade (1) is shaped so as to allow a slight movement of the card (4) beyond the end-of-travel position and in that the second blade (2) includes a bearing surface (5) shaped so as to be able to be forced by the card (4), when the card is moved beyond the end-of-travel position, to move the second blade (2) to a position in which it is no longer in contact with the first blade (1), or alternatively to a position in which it comes into contact with the first blade.

2. Connector according to claim 1, characterized in that the two blades (1,2) extend approximately parallel to the direction of movement (D) of the card (4) and each have, close to their free end, a part (3,5) bent into the shape of a hump constituting the said bearing surface.

3. Connector according to claim 2, characterized in that the two hump-shaped bent parts of the two blades (1,2) are offset along the direction of movement (D) of the card (4).

4. Connector according to claim 2, characterized in that the two blades (1,2) are approximately coplanar.

5. Connector according to claim 4, characterized in that the first blade (1) has, at its free end beyond the hump-shaped bent part (3), a branch (6) which extends towards the second blade (2) and is capable of coming into contact with a part (7) of the second blade.

6. Connector according to claim 5, characterized in that the said part (7) of the second blade (2) is a branch of the latter, this branch forming a fork with an adjacent branch (8) carrying the hump-shaped bent part (5) of the second blade (2).

7. Connector according to claim 4, characterized in that the straight part (9) of the two blades (1,2) is housed in an electrically insulating part of the connector.

8. Connector according to claim 1, characterized in that the blades (1,2) are produced by cutting them out from a flat metal sheet (10), followed by bending them in order to form the bearing surfaces (3,5).

9. Connector according to claim 1, characterized in that it includes three blades (11,12,13) which are approximately parallel and separated from one another with respect to the plane of insertion of the card (4) into the reader, the first blade (11) carrying, near its end, a bent part (14) forming a hump extended by an end (15) capable of coming into contact with the second blade (12) upon insertion of the card (4) the second blade (12) carrying, near its end, a bent part (16) forming a hump, which part (16) is offset with respect to the bent part (14) of the first blade (11) along the direction of movement of the card and is extended by an end (17) capable of coming into contact with the end (18) of the third blade (13) when the card (4) is moved beyond the end-of-travel position, the third blade (13) being straight over its entire length.

10. Connector according to claim 9, characterized in that the height h of the bent part (14) of the first blade (11), the distance h' between the end (15) of the first blade (11) and the second blade (12), the height H of the bent part (16) of the second blade (12) and the distance e between the end (17) of the second blade (12) and the end (18) of the third blade (13) satisfy the following relationship:

$$H > h + e > h > h'.$$

* * * * *